United States Patent [19]

Herliczek et al.

[11] Patent Number: 5,028,287
[45] Date of Patent: Jul. 2, 1991

[54] METHOD FOR APPLYING AN ANTI-LACERATIVE PLASTIC LAYER TO GLASS

[75] Inventors: Siegfried H. Herliczek, Petersburg, Mich.; Charles E. Ash, Jr., Perrysburg, Ohio; Stephen P. Bartus, Jr.; Ronald L. Toth, both of Toledo, Ohio

[73] Assignee: Libbey-Owens-Ford Co., Toledo, Ohio

[21] Appl. No.: 948,452

[22] Filed: Dec. 29, 1986

Related U.S. Application Data

[63] Continuation of Ser. No. 717,060, Mar. 28, 1985, abandoned, which is a continuation-in-part of Ser. No. 604,876, Apr. 27, 1984, abandoned.

[51] Int. Cl.$^5$ .............................................. B32B 17/00
[52] U.S. Cl. ..................................... 156/99; 156/102; 156/104; 156/108; 156/182; 156/252; 156/256; 156/267; 156/289; 156/324.4; 428/78; 428/138; 428/429
[58] Field of Search ............................... 156/311, 101

[56] References Cited

U.S. PATENT DOCUMENTS

| | | | |
|---|---|---|---|
| 2,303,151 | 11/1942 | Watkins et al. | 156/101 |
| 2,948,645 | 8/1960 | Keim | 156/104 |
| 3,743,562 | 7/1973 | Phipps | 156/64 |
| 3,762,981 | 10/1973 | Blank | 156/99 |
| 3,781,184 | 12/1973 | Domicone et al. | 156/324.4 |
| 3,808,077 | 4/1974 | Rieser et al. | 156/289 |
| 4,065,340 | 12/1977 | Dickerson | 156/289 |
| 4,242,403 | 12/1980 | Mattimoe et al. | 428/437 |

Primary Examiner—John J. Gallagher
Attorney, Agent, or Firm—Marshall & Melhorn

[57] ABSTRACT

The present invention concerns a unique method for producing an anti-lacerative glass assembly wherein a plastic composite anti-laceration sheet is to be bonded to a glass substrate sheet. The plastic anti-laceration sheet includes an inner layer of polyvinyl butyral adpated to abut the glass substrate sheet, an intermediate layer of polyester, and an outer layer of abrasion resistant material. A glass cover sheet having substantially the same curvature as the glass substrate sheet is utilized to press the anti-laceration sheet into bonding engagement with the glass substrate sheet. In accordance with the present invention, the bonding operation is accomplished by heating the laminated glass assembly to a predetermined temperature in the range of 285° F. to 305° F. The present invention also concerns the use of a unique vacuum ring construction which is mounted about the periphery of the laminated assembly and it utilized to de-air the assembly. The vacuum ring is provided with a check valve to maintain the vacuum within the ring during periods wherein it is disconnected from a vacuum source. Further, the method of the present invention includes the step of removing a selected portion or portions of the anti-laceration sheet after it has been bonded to the glass substrate sheet to provide an exposed glass surface for use in mounting the glass assembly into an associated frame. In an alternate method, positioning gasket means can be provided on the glass cover sheet to define a boundary for the anti-laceration sheet and contact the glass substrate sheet to provide an exposed glass surface on the glass assembly.

14 Claims, 3 Drawing Sheets

METHOD FOR APPLYING AN ANTI-LACERATIVE PLASTIC LAYER TO GLASS

CROSS REFERENCE TO RELATED APPLICATION

The present application is a continuation of application Ser. No. 06/717,060, filed Mar. 28, 1985, now abandoned, which in turn is a continuation-in-part of application Ser. No. 604,876 filed Apr. 27, 1984, now abandoned.

BACKGROUND OF THE INVENTION

The present invention relates generally to a method for applying a layer of plastic material to a glass sheet and, in particular, to a method for producing an anti-lacerative window assembly for use in automotive vehicles.

It has been found that the addition of a plastic layer bonded to the inboard glass surface of a conventional laminated windshield can further increase the safety effectiveness of the windshield. This plastic layer has typically been termed an anti-laceration shield since it has been found that the additional plastic layer will appreciably reduce the number and severity of lacerative injuries to persons thrown against the windshield under all impact conditions. Further, it has been found that the anti-laceration shield, when produced under certain conditions of manufacture, improves the ability of the laminated windshield to decelerate movement of a person thrown against the windshield, while also increasing the penetration resistance of the windshield as compared to conventional laminated windshields. Also, the laceration shield reduces the amount of flying glass and thus the injury to car occupants as a result of objects that may be thrown against he windshield from overpasses or elsewhere outside the vehicle.

An example of one type of anti-lacerative windshield is disclosed in U.S. Pat. No. 4,242,403. In this patent, the laceration shield includes a penetration resisting multilayer body consisting of an inner layer of relatively soft, extensible plastic material such as polyvinyl butyral, which is adhered to the inboard surface of the windshield, an intermediate layer of more durable plastic such as polyester, and an outer coating of an abrasion resistant material. Another type of anti-lacerative windshield is disclosed in U.S. Pat. No. 3,808,077 wherein a single layer of polyurethane is utilized as an anti-laceration shield.

While the effectiveness of a laminated windshield having an anti-laceration shield is obvious, very few vehicles utilize such a windshield. The chief reason for this limited use has been the difficulty experienced in trying to manufacture a windshield with an anti-laceration shield on a production basis. In the automotive industry, the standard for windshields is very high, especially as to optical qualities, and it has been very difficult to manufacture a windshield having an anti-laceration shield which is free of optical defects. Even when the individual sheets of the laminated assembly are free from optical defects before bonding them together, it is difficult to join them and preserve the optical qualities.

SUMMARY OF THE INVENTION

The present invention concerns a unique method for producing an anti-lacerative glass assembly. The initial step involved assembling a glass substrate sheet having a predetermined curvature, an anti-laceration sheet and a glass cover sheet having substantially the same curvature as a glass substrate sheet into a stacked arrangement. In the preferred embodiment of the invention, the anti-laceration sheet is a plastic composite sheet which includes an inner layer of polyvinyl butyral adapted to abut the glass substrate sheet, an intermediate layer of polyester, and an outer layer of an abrasion resistant material adapted to abut the glass cover sheet. Once the stacked arrangement of individual laminae have been assembled, a vacuum ring is placed about the peripheral edges of the laminated glass assembly and is coupled to a vacuum source to de-air the assembly and urge the individual laminae toward one another.

Next, the assembly is placed in an autoclave unit wherein the laminated glass assembly is heated to a predetermined temperature in the range of 285° F. to 305° F., while simultaneously pressure is applied to the exterior surfaces of the laminated assembly. It has been discovered that, when a plastic composite anti-laceration sheet of the type described above is utilized, the autoclave bonding temperature is very critical. For example, the autoclave temperature must be sufficiently high to enable the intermediate polyester layer to properly bond to the inner polyvinyl butyral layer, and the temperature must be sufficiently low to prevent crazing of the abrasion resistant coating.

Once a predetermined temperature and a predetermined pressure have been reached in the autoclave, these levels are maintained for a predetermined time period. At the end of this time period, the temperature in the autoclave is reduced while the pressure is maintained at the predetermined level. After the temperature has fallen below a predetermined point such as 125° F., the pressure then can be reduced, and the laminated assembly can be removed from the autoclave.

The present invention also concerns the use of a vacuum ring having a unique construction. The vacuum ring is provided with a check valve means such that the vacuum ring can be disconnected from a vacuum source while maintaining the vacuum within the ring. If desired, the vacuum ring can then be reconnected to the vacuum source.

The method of the present invention further includes the step of, subsequent to producing an anti-lacerative glass assembly, removing a selected portion or portions of the anti-laceration sheet from the glass substrate sheet to define an exposed glass surface which can be used either to mount the windshield within an associated frame, or to mount a rear view mirror assembly. In an alternative method, positioning means can be provided on the glass cover sheet to define a boundary for the marginal edges of the anti-laceration sheet inwardly spaced from the marginal edges of the glass substrate sheet. The anti-laceration sheet is formed to fit inside the boundary to produce an exposed glass sruface where the positioning means contacts the glass substrate sheet during the bonding of the assembly.

DESCRIPTION OF THE PREFERRED EMBODIMENT

Figure 1:
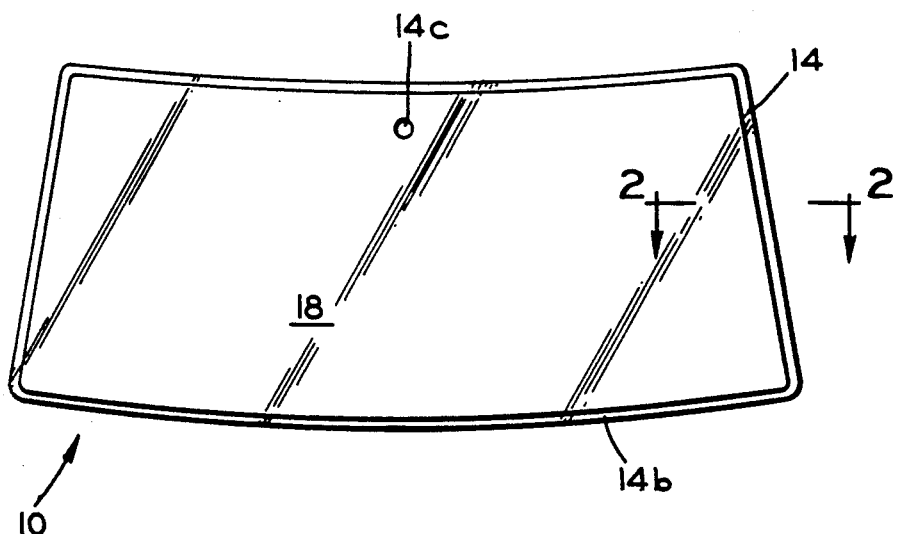
FIG. 1 is a rear elevational view of a laminated window assembly produced by the method of the present invention.

It should be noted at the outset of this description that, while the embodiment of the invention illustrated in the drawings and described herein concerns an anti-lacerative window assembly consisting of two laminated sheets of glass, it will be appreciated that the method and apparatus of the present invention can readily be adapted to produce an anti-lacerative window consisting of a single sheet of glass. Also, while the preferred embodiment of the invention is described as a vehicle windshield, it will be appreciated that the anti-lacerative window can also be used as a side or rear vehicle window, or as a window in other types of safety applications.

Figure 2:
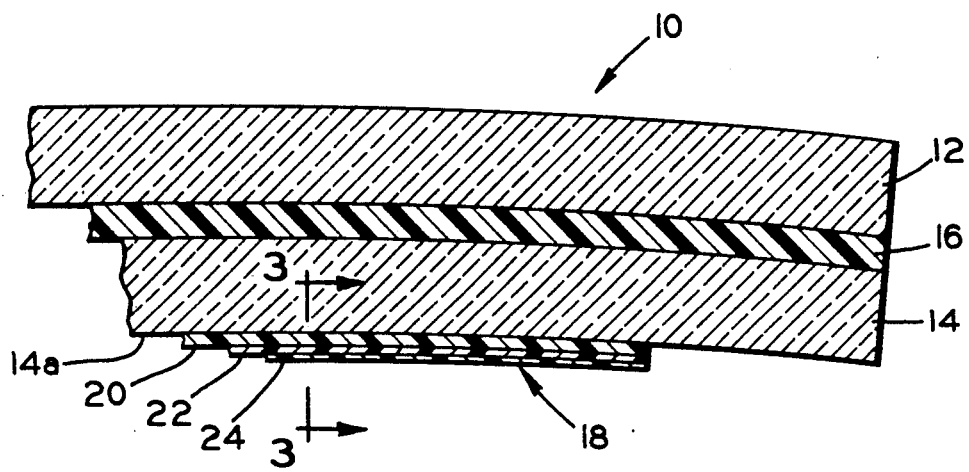
FIG. 2 is a fragmentary sectional view taken along the line 2—2 of FIG. 1.
Figure 3:
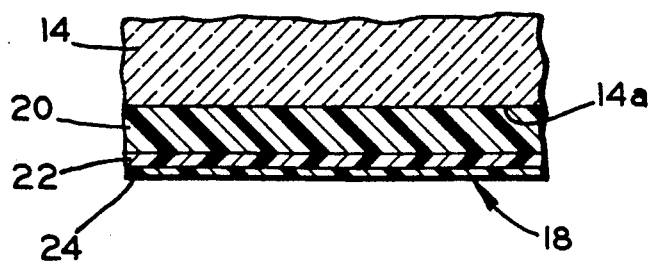
FIG. 3 is an enlarged sectional view taken along the line 3—3 of FIG. 2 and illustrating the individual laminae which comprise the plastic composite anti-laceration sheet.

Referring to FIGS. 1 through 3, there is shown one type of laminated glass assembly, such as an automotive windshield 10, which can be produced by the method of the present invention. The windshield 10 includes two sheets of glass 12 and 14 which are bonded together by means of a plastic interlayer 16 positioned therebetween. The plastic interlayer 16 is typically a sheet of relatively soft extensible plastic material in the range of 0.025 to 0.040 inch thick and capable of being bonded to a glass surface. In the preferred embodiment of the invention, the plastic interlayer 16 is a sheet of polyvinyl butyral approximately 0.030 to 0.0375 inch thick. Also, the glass sheets 12 and 14 are preferably sheets of float glass, in thicknesses in the range of 0.070 inch to 0.125 inch. In the preferred embodiment of the invention, the glass sheets 12 and 14 are approximately 0.100 inch thick. If a single ply anti-lacerative window is to be produced, the single sheet of glass is typically in the range of 0.090 to 0.150 inch thick.

Additionally, the glass sheet 14, which is adapted to face the interior of the vehicle, has a plastic composite anti-laceration sheet 18 bonded to the inboard glass surface 14a. As shown in the enlarged sectional view of FIG. 3, the anti-laceration sheet 18 is a three layer composite sheet comprising a layer 20 of a relatively soft extensible plastic material, a layer 22 of a more durable plastic material, and an outer coating or layer 24 of an abrasion resistant plastic material. In the preferred embodiment of the invention, the soft extensible plastic layer 20 is approximately 0.015 inch thick and can be polyvinyl butyral, for example, while the more durable plastic layer 22 is approximately 0.002 to 0.007 inch thick and can be a heat treated polyester, for example. If a single ply anti-lacerative window is to be produced, the inner layer of polyvinyl butyral is typically 0.030-0.045 inch thick.

The abrasion resistance coating 24 is relatively thin as compared to the layers 20 and 22 and can be cured, organopolysiloxane compound reinforced with silica. More specifically, the plastic layers 20 and 22 and the abrasion resistant coating 24 may be of the types described in U.S. Pat. Nos. 3,900,673; 4,059,469; 4,112,171; 4,177,315; and 4,242,403, all of which are herein incorporated by reference. A plastic composite anti-laceration sheet of the type utilized in the preferred embodiment of the invention is available from the E. I. Dupont Company.

As previously mentioned, the present invention concerns a unique method for producing a laminated glass assembly of the type as illustrated in FIGS. 1 through 3. In the method of the present invention, the individual laminae which comprise the laminated assembly are first assembled in two separate sub-assemblies. The first sub-assembly 26, illustrated in FIG. 4a, comprises a stacked arrangement which includes the pair of glass sheets 12 and 14 having the plastic interlayer 16 positioned therebetween. The second sub-assembly 28, illustrated in FIG. 4b, includes the plastic composite anti-laceration sheet 18 which is placed on a surface 30a of a glass cover sheet 30 having substantially the same curvature as the glass sheets 12 and 14. The composite anti-laceration sheet is placed on the cover sheet 30 such that the abrasion resistance coating 24 abuts the surface 30a. Typically, the cover sheet 30 is formed of a sheet of float glass. As will be discussed, the cover sheet 30 is utilized to produce a laminated glass assembly of high optical quality by assisting in bonding the anti-laceration sheet 18 to the outer surface 14a of the glass sheet 14.

It has been discovered that, in producing a an anti-laceration windshield of the type shown in FIGS. 1 through 3, it is desirable that the anti-laceration sheet 18 not cover selected portions of the inboard glass surface 14a such that those selected portions provide an exposed glass surface. For example, in FIG. 1, the marginal edge of the laceration sheet 18 is spaced inwardly from the marginal edge of the glass sheet 14 to define a peripheral edge portion 14b having an exposed glass surface. It has been discovered that such an exposed glass surface is desirable when mounting the windshield in an associated vehicle frame, since the adhesives typically utilized to secure the windshield within the frame have been found to adhere more readily to a glass surface than to the plastic surface of the anti-laceration sheet. Also, in FIG. 1, a circular cutout is provided in the anti-laceration sheet 18 to define a circular portion 14c having an exposed glass surface. The circular portion 14c can be utilized for securing a rear view mirror mount assembly to the windshield.

In addition to providing a better adhesive surface, the selected exposed glass surfaces also provide other advantages. For example, in the event a windshield must be temporarily removed from the vehicle, or a mirror mount must be replaced, any damage to the anti-laceration sheet is avoided. Also, if the vehicle window frame or the mirror mount was adhered directly to the anti-laceration sheet, any separation of the frame or mirror mount from the windshield tends to separate the anti-laceration sheet from the glass substrate sheet, thereby causing distortion in those areas.

While the anti-laceration sheet 18 can be bonded to the entire glass surface 14a, and selected portions of the laceration sheet can subsequently be removed from the glass surface 14a to provide the selected exposed glass surface portions 14b and 14c, the removal of selected portions of the anti-laceration sheet can be a relatively time consuming task and can effect damage to the glass substrate sheet. Preferably, the anti-laceration sheet is initially precut to predetermined dimensions such that, when the anti-laceration sheet is properly positioned and bonded to the glass sheet 14, the selected portions of the glass surface 14a will remain exposed and there is no need for any subsequent trimming and removal of portions of the anti-laceration sheet.

In order to assist in positioning the anti-laceration sheet 18 on the glass surface 14a, the method of the present invention utilizes a cover sheet 30 of a unique design. More specifically, the glass cover sheet 30 of the present invention includes a positioning means such as a dam or gasket 32, for example, which is secured about the peripheral edges of the surface 30a to define a boundary within which the anti-laceration sheet 18 is to be placed. The gasket 32 is constructed of a resilient material having a thickness approximately equal to the overall thickness of the anti-laceration sheet. While the gasket 32 can be constructed of cork, silicone, fiber-reinforced silicone, or rubber, it has been found desirable to construct the gasket of Teflon. Typically, the surface of the Teflon gasket which is to be secured to the glass surface of the cover sheet is specially treated to assist in the adhesion of the gasket to the cover sheet. It has been found that a conventional epoxy provides a suitable means for securing the Teflon gasket to the glass surface.

The location on the cover sheet surface 30a to which the gasket 32 is secured corresponds to the peripheral edge portion 14b on the glass surface 14a which is to remain exposed. In addition to the peripheral gasket 32, a circular gasket 34 is secured to the surface 30a at the location corresponding the exposed circular portion 14c for the mirror mount assembly. Thus, in the preferred embodiment of the invention, the plastic composite anti-laceration sheet 18 is precut to dimensions which enable the sheet 18 to be placed on the cover sheet surface 30a within the boundary of the peripheral gasket 32. Moreover, as shown in FIG. 4b, a circular cutout portion 18a is provided in the anti-laceration sheet at the location corresponding to the circular gasket 34.

It has been found that, prior to placing the anti-laceration sheet 18 on the surface 30a of the glass cover sheet 30, it is desirable to apply a release agent to the surface 30a to enable the cover sheet 30 to be easily removed from the anti-laceration sheet after the anti-laceration sheet has been bonded to the glass sheet 14. While the release agent can be a conventional silicone wax, it is preferable to utilize a silane having the formula $R_n$—Si—$(OR)_{4-n}$ wherein R is an alkyl group and n is a number from 1 to 3. In this connection, good results have been obtained with the use of an alkyl-trialkoxy silane and particularly n-propyl-trimenthoxy silane, and dialkyl-dialkoxy silanes, particularly diethyl-diethoxy silane.

Figure 4A:
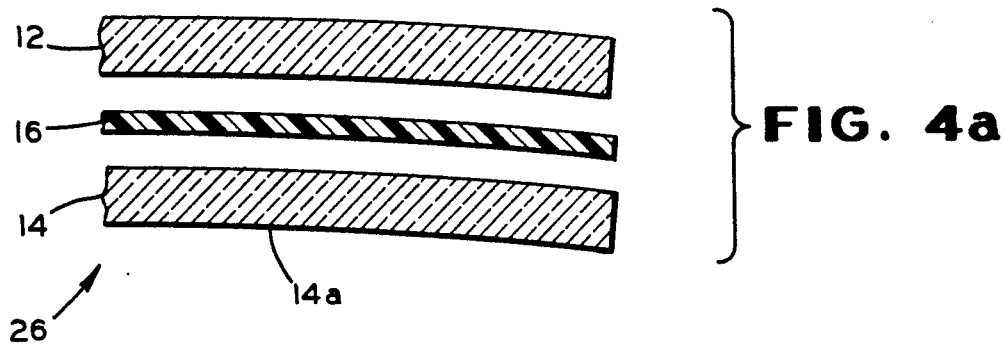
FIG. 4a is a fragmentary sectional view illustrating the individual laminae which comprise the first subassembly utilized in the method of the present invention.
Figure 4B:
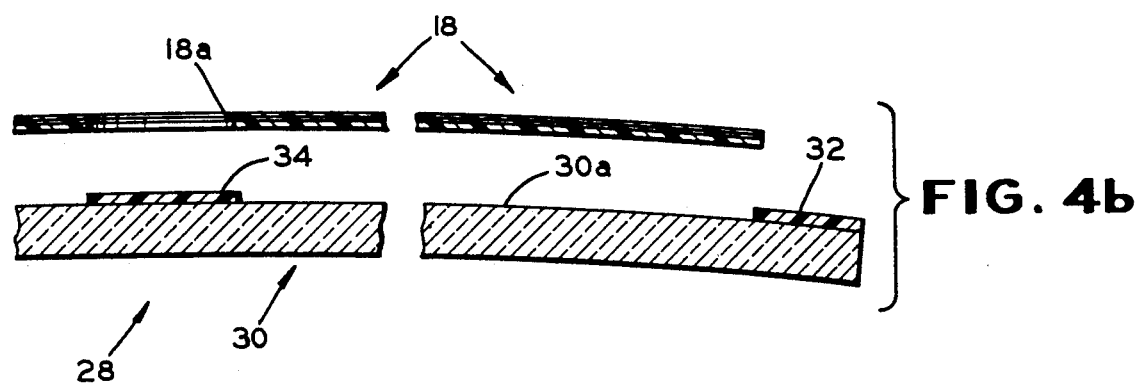
FIG. 4b is a fragmentary sectional view illustrating the individual laminae which comprise the second subassembly utilized in the method of the present invention.
Figure 6:
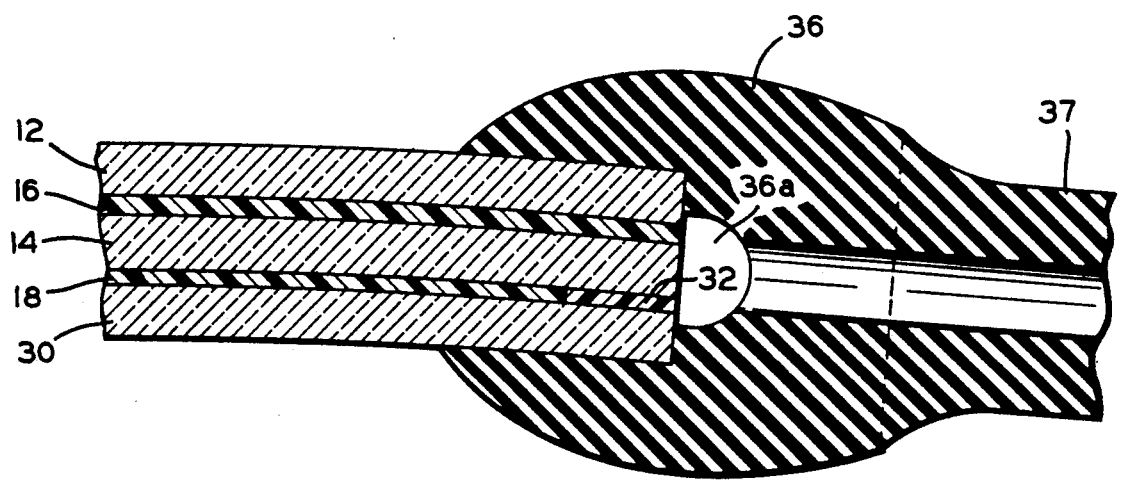
FIG. 6 is a fragmentary sectional view taken along the line 6—6 of FIG. 5 and illustrating the laminated glass assembly having the vacuum ring positioned about the peripheral edge thereof.

After the two individual sub-assemblies as illustrated in FIGS. 4a and 4b are produced, the two individual sub-assemblies are assembled to produce a laminated glass assembly wherein the polyvinyl butyral layer of the anti-laceration sheet 18 of the second sub-assembly 28 abuts the outwardly facing glass surface 14a of the first sub-assembly 26. The gasket 32 contacts a predetermined marginal edge portion of the facing surface of the glass substrate sheet 14, as shown in FIG. 6, during the bonding operation to produce an exposed glass surface on the laminated assembly. Prior to assembling the two sub-assemblies, it is preferable to apply a primer to the outer glass surface 14a to assist in bonding the anti-laceration sheet 18 to the glass sheet 14. The primer can be a silane solution which includes 0.5 to 3% by volume of silane in a solvent such as isopropyl alcohol. The silane can be gamma-aminopropyltriethoxysilane which is available from Union Carbide under the trade designation A-1100.

Figure 5:
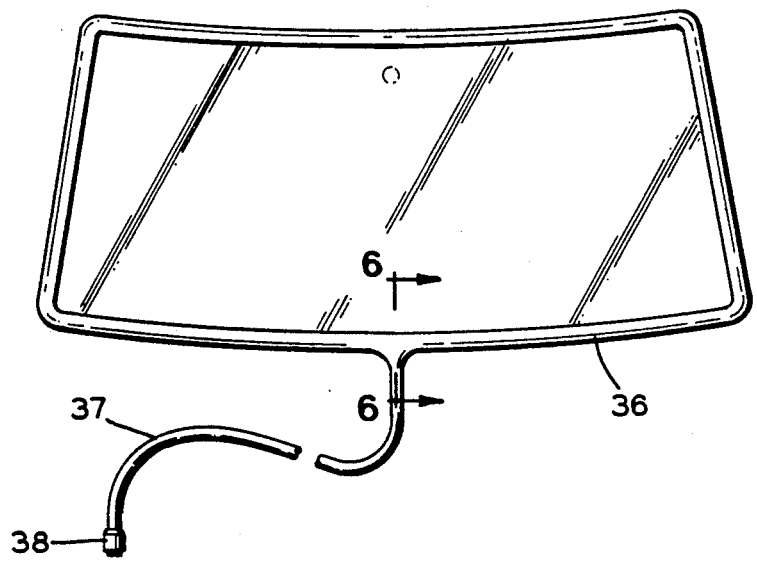
FIG. 5 is a plan view of the laminated glass assembly having a vacuum ring attached thereto which is utilized to evacuate any air spaces between the individual laminae.

After the first and second sub-assemblies have been positioned together to form the laminated glass assembly, the air spaces between the individual laminae are evacuated to urge the individual laminae toward one another. This can be accomplished by positioning a vacuum ring 36, as shown in FIGS. 5 and 6, about the peripheral edge of the laminated glass assembly. The vacuum ring 36 defines an interior chamber 36a in communication with a flexible conduit 37 which is adapted to be coupled to a vacuum source (not shown). The vacuum ring 36 can be constructed of silicone or neoprene, for example.

The method of the present invention utilizes a vacuum ring having a unique construction. More specifically, the vacuum ring is provided with a quick-disconnect coupling 38 having a check valve means incorporated therein. Such a coupling is commercially available from Crawford Fitting Co. of Solon, Ohio as Part No. SS-QC-4-D-4HC. After the vacuum ring 36 has been positioned about the laminated glass assembly and coupled to a vacuum source for a predetermined period of time to de-air the assembly, the vacuum ring can be disconnected from the vacuum source, and the check valve means will continue to maintain the vacuum in the chamber 36a.

The laminated assembly having the vacuum ring attached is then placed in an autoclave unit (not shown) which is designed to apply pressure to the exterior surfaces of the laminated assembly, while simultaneously heating the entire laminated assembly to a predetermined temperature to cause the plastic interlayer 16 to bond to the pair of glass sheets 12 and 14 and to cause the PVB layer of the anti-laceration sheet 18 to bond to the surface 14a of the glass sheet 14. In the event a plastic composite anti-laceration sheet of the type shown in FIG. 3 is used, the autoclave operation also causes the intermediate polyester layer 22 to bond to the inner polyvinyl butyral layer 20. While in the autoclave, the vacuum ring 36 can be connected to the vacuum source to maintain the vacuum within the chamber 36a during the bonding operation.

Typically, the pressure in the autoclave is in the range of 200 to 275 psi, while the temperature is in the range of 250° F. to 325° F. This temperature and pressure are typically maintained for approximately twenty to thirty minutes to assure a effective bonding between the individual laminae.

It has been discovered that, in the event a plastic composite anti-laceration sheet of the type shown in FIG. 3 is used, the autoclave bonding temperature is very critical. For example, the autoclave temperature must be sufficiently high to enable the intermediate polyester layer 22 to properly bond to the inner polyvinyl butyral layer 20, and the temperature must be sufficiently low to prevent crazing of the abrasion resistance coating 24. It has been found that an autoclave temperature in the range of 285° F. to 305° F. provides satisfactory results. For optimum results, a temperature of approximately 295° F. should be used.

Figure 7:
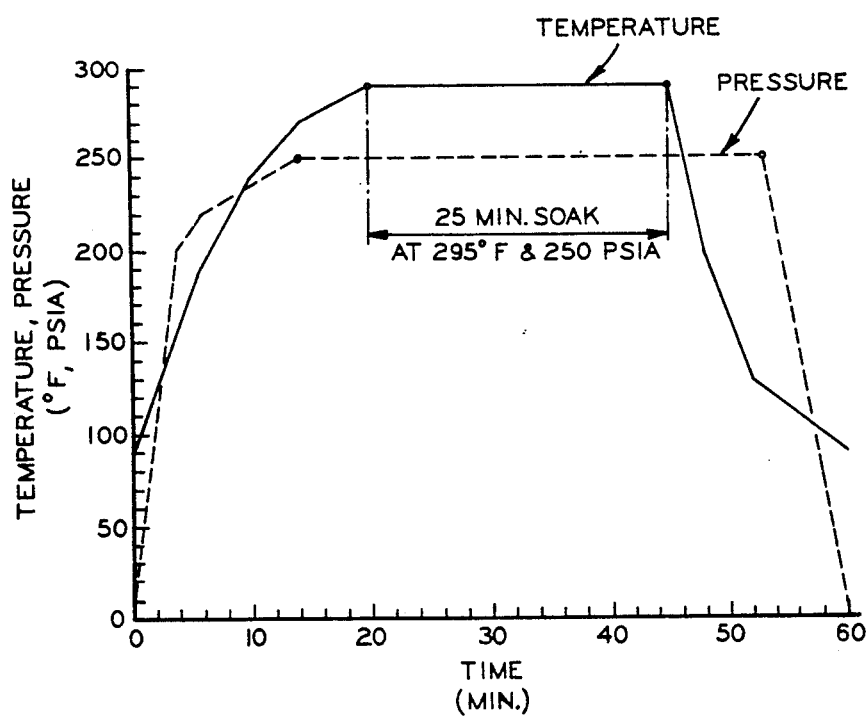
FIG. 7 is a diagram illustrating the preferred pressure-temperature sequence which occurs during the autoclave operation.

FIG. 7 illustrates a time diagram of the preferred temperature/pressure sequence for the autoclave bonding operation of an anti-laceration window assembly utilizing the composite anti-laceration sheet of FIG. 3. As shown in FIG. 7, after the laminated assembly has been placed in the autoclave and the autoclave has been sealed, the pressure and temperature is increased until the pressure reaches 250 p.s.i. and the temperature reaches 295° F. The pressure and temperature are then maintained at these levels for approximately 25 minutes.

After the 25 minute period, the temperature is reduced while the pressure is maintained at 250 p.s.i. to ensure that the surface 30a of the cover sheet 30 is maintained in complete contact with the anti-laceration sheet. Otherwise, reducing the pressure before the laminated assembly has sufficiently cooled can cause the cover sheet to pull away from the anti-laceration sheet in certain areas, thereby causing increased distortion in those areas. After the temperature has fallen below a predetermined point, the pressure can then be reduced, and the laminated assembly can be removed from the autoclave. It has been found that allowing the temperature to fall below 125° F. before reducing the pressure provides satisfactory results.

After the laminated assembly has been removed from the autoclave, the vacuum ring 36 is removed. Next, the cover sheet 30 can be removed from the laminated assembly such that the remaining portion of the laminated assembly constitutes the anti-laceration windshield 10 of FIG. 1.

In accordance with the provisions of the patent statutes, the principle and mode of operation of the present invention have been illustrated and described in what is considered to represent the preferred embodiment. However, it should be understood that the present invention can be practiced otherwise than as specifically illustrated and described without departing from the scope of the following claims.

What is claimed is:

1. A method of producing an anti-lacerative glass assembly comprising the steps of:
    (a) assembling into a stacked arrangement individual laminate including a glass substrate sheet having a predetermined curvature, a plastic composite anti-laceration sheet having one surface abutting the glass substrate sheet, and a glass cover sheet having substantially the same curvature as the glass substrate sheet and abutting the opposite surface of the composite anti-laceration sheet, said glass cover sheet having a positioning means adhered thereto and adapted to define a boundary for at least a portion of the marginal edge of the anti-laceration sheet in inwardly spaced relationship relative to the marginal edge of the glass substrate sheet and to contact a predetermined portion of the marginal edge surface of the glass substrate sheet during a subsequent bonding operation, the plastic composite anti-laceration sheet including an inner layer of polyvinyl butyral adapted to abut the glass substrate sheet, an intermediate layer of polyester, and an outer layer of an abrasion resistant material adapted to abut the glass cover sheet;
    (b) urging the individual laminae of the glass assembly toward one another;
    (c) simultaneously with step (b), heating the glass assembly to a predetermined temperature in the range of 285° F. to 305° F., for a predetermined period and then subsequently reducing the temperature, said predetermined temperature being sufficiently high to cause the intermediate layer of polyester to bond to the inner layer of polyvinyl butyral and to cause the inner layer of polyvinyl butyral to bond to the glass substrate sheet and being sufficiently low to prevent crazing of the abrasion resistant coating; and
    (d) removing the glass cover sheet from the laminated glass assembly to produce the anti-lacerative glass assembly wherein the predetermined portion of the marginal edge surface of the glass substrate sheet which was contacted by the positioning means becomes an exposed glass surface.

2. The method according to claim 1 wherein step (b) includes the step of applying a predetermined pressure in the range of 225 to 275 psi for a second predetermined time period to the exterior surfaces of the laminated assembly to urge the individual laminae toward one another and then subsequently reducing the pressure.

3. The method according to claim 2 wherein said predetermined temperature and pressure are both maintained for a predetermined time period in the range of 20 to 30 minutes.

4. The method according to claim 2 wherein, prior to reducing the predetermined pressure applied to the laminate glass assembly, the laminated glass assembly is cooled to a temperature less than 125° F.

5. The method according to claim 2 including, simultaneously with step (b), the step of evacuating spaces between the individual laminae to further urge the individual laminae toward one another.

6. The method according to claim 1 wherein said predetermined temperature is approximately 295° F.

7. The method according to claim 2 wherein said predetermined pressure is approximately 250 p.s.i.

8. The method according to claim 3 wherein said predetermined time period is approximately 25 minutes.

9. A method of producing an anti-lacerative glass assembly comprising the steps of:
    (a) assembling into a stacked arrangement individual laminae including a glass substrate sheet, having a predetermined curvature, a plastic anti-laceration sheet having one surface abutting the glass substrate sheet, and a glass cover sheet having substantially the same curvature as the glass substrate sheet and abutting the opposite surface of the anti-laceration sheet, said glass cover sheet having a positioning means adhered thereto and adapted to define a boundary for at least a portion of the marginal edge of the anti-laceration sheet in inwardly spaced relationship relative to the marginal edge of the glass substrate sheet and to contact a predetermined portion of the marginal edge surface of the glass substrate sheet during a subsequent bonding operation, thereby producing a glass assembly for subsequent lamination;
    (b) placing a vacuum ring about the peripheral edges of the glass assembly, the vacuum ring including a conduit adapted to be coupled to a vacuum source, the conduit provided with a check valve means for maintaining the vacuum within the ring when the conduit is disconnected from the vacuum source;

(c) connecting the conduit to a vacuum source to urge the individual laminae toward one another and evacuate air spaces between the individual laminae;

(d) disconnecting the conduit from the vacuum source wherein the check valve means provided in the conduit maintains the vacuum within the ring;

(e) placing the glass assembly having the vacuum ring attached thereto within an autoclave unit;

(f) reconnecting the conduit of the vacuum ring to a vacuum source;

(g) pressurizing the heating the glass assembly within the autoclave to cause the anti-laceration sheet to bond to the glass substrate sheet; and (h) removing the glass cover sheet from the laminated glass assembly to produce the anti-lacerative glass assembly
wherein the predetermined portion of the marginal edge surface of the glass substrate sheet which was contacted by the positioning means becomes an exposed glass surface.

10. A method of producing an anti-lacerative glass assembly comprising the steps of:

(a) providing a glass substrate sheet having a predetermined curvature;

(b) providing a plastic anti-laceration sheet having an outer periphery smaller than the outer periphery of the glass substrate sheet;

(c) providing a glass cover sheet having substantially the same curvature as the glass substrate sheet and adhering a positioning means to one surface thereof;

(d) assembling into a stacked arrangement individual laminae including the glass substrate sheet, the plastic anti-laceration sheet abutting an outwardly facing surface of the glass substrate sheet, and the glass cover sheet abutting an outwardly facing surface of the anti-laceration sheet, the positioning means of the glass cover sheet adapted to define a boundary for at least a portion of the marginal edge of the anti-laceration sheet in inwardly spaced relationship relative to the marginal edge of the glass substrate sheet and to contact a predetermined portion of the marginal edge surface of the glass substrate sheet during a subsequent bonding operation;

(e) urging the individual laminae of the laminated glass assembly toward one another;

(f) simultaneously with step (e), heating the glass assembly to a predetermined temperature to cause the anti-laceration sheet to bond to the glass substrate sheet; and (g) removing the glass cover sheet and positioning means from the laminated glass assembly to produce an anti-lacerative glass assembly wherein the predetermined portion of the marginal edge of the glass substrate sheet which was contacted by the positioning means is an exposed glass surface.

11. The method according to claim 10 including, subsequent to step (g), applying an adhesive to the exposed glass surface.

12. The method according to claim 10 including, subsequent to step (g), securing the anti-lacerative glass assembly to an associated frame by applying an adhesive to the exposed glass surface.

13. A method of producing an anti-lacerative glass assembly comprising the steps of:

(a) providing a glass substrate sheet having a predetermined curvature;

(b) providing a plastic anti-laceration sheet;

(c) removing a predetermined cutout portion from the interior of the plastic anti-laceration sheet;

(d) providing a glass cover sheet having substantially the same curvature as the glass substrate sheet and adhering a gasket means to one surface thereof;

(e) assembling into a stacked arrangement individual laminae including the glass substrate sheet, the plastic anti-laceration sheet abutting one surface of the glass substrate sheet, and the glass cover sheet abutting an outwardly facing surface of the anti-laceration sheet, the gasket means of the cover sheet adapted to be inserted into and provide a boundary for the cutout provided in the anti-laceration sheet and to contact a predetermined interior portion of the one surface of the glass substrate sheet during a subsequent bonding operation;

(f) urging the individual laminae of the glass assembly toward one another;

(g) simultaneously with step (f), heating the glass assembly to a predetermined temperature to cause the anti-laceration sheet to bond to the glass substrate sheet; and (h) removing the glass cover sheet and gasket means from the laminated glass assembly to produce an anti-lacerative glass assembly wherein the predetermined interior portion of the one surface of the glass substrate sheet which was contacted by the gasket means is an exposed glass surface.

14. The method according to claim 11 wherein the predetermined cutout portion of the anti-laceration sheet removed in step (c) defines an exposed glass surface for adhesively securing a mirror mount thereto.

* * * * *